US008306192B2

(12) United States Patent
Bushey et al.

(10) Patent No.: US 8,306,192 B2
(45) Date of Patent: *Nov. 6, 2012

(54) SYSTEM AND METHOD FOR PROCESSING SPEECH

(75) Inventors: Robert R. Bushey, Round Rock, TX (US); Benjamin Anthony Knott, Cedar Park, TX (US); John Mills Martin, Austin, TX (US); Sarah Korth, Chicago, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 107 days.

This patent is subject to a terminal disclaimer.

(21) Appl. No.: 12/750,792

(22) Filed: Mar. 31, 2010

(65) Prior Publication Data

US 2010/0185443 A1    Jul. 22, 2010

Related U.S. Application Data

(63) Continuation of application No. 11/809,817, filed on Jun. 1, 2007, now Pat. No. 7,720,203, which is a continuation of application No. 11/005,494, filed on Dec. 6, 2004, now Pat. No. 7,242,751.

(51) Int. Cl.
   *H04M 1/64* (2006.01)
(52) U.S. Cl. ..................... 379/88.03; 704/270
(58) Field of Classification Search .... 379/88.01–88.14; 704/1–10, 252, 255, 270, 275
   See application file for complete search history.

(56) References Cited

U.S. PATENT DOCUMENTS

| | | | |
|---|---|---|---|
| 4,953,204 A | 8/1990 | Cuschleg, Jr. et al. | |
| 4,967,405 A | 10/1990 | Upp et al. | |
| 5,335,269 A | 8/1994 | Steinlicht | |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,555,299 A | 9/1996 | Maloney et al. | |

(Continued)

FOREIGN PATENT DOCUMENTS

EP    0424015 A2    4/1991

(Continued)

OTHER PUBLICATIONS

Ogino, Tsukasa at al. "Technologies for Internet Infrastructure: Eliminating the World Wide Wait," iNet Japan, Jul. 18-21, 2000 <http://www.isoc.org/inet2000/cdproceedings/1g/index.htm> 19 pages.

(Continued)

*Primary Examiner* — Yuwen Pan
*Assistant Examiner* — Assad Mohammed
(74) *Attorney, Agent, or Firm* — Toler Law Group, PC (57) ABSTRACT

Systems and methods for processing speech are provided. A system may include a speech recognition interface and a processor. The processor may convert speech received from a call at the speech recognition interface to at least one word string. The processor may parse each word string of the at least one word string into first objects and first actions. The processor may access a synonym table to determine second objects and second actions based on the first objects and the first actions. The processor may also select a preferred object and a preferred action from the second objects and the second actions.

20 Claims, 3 Drawing Sheets

U.S. PATENT DOCUMENTS

| | | | |
|---|---|---|---|
| 5,590,186 A | 12/1996 | Liao et al. | |
| 5,630,121 A | 5/1997 | Braden-Harder et al. | |
| 5,652,789 A | 7/1997 | Miner et al. | |
| 5,737,723 A * | 4/1998 | Riley et al. | 704/243 |
| 5,754,639 A | 5/1998 | Flockhart et al. | |
| 5,754,978 A | 5/1998 | Perez-Mendez et al. | |
| 5,797,723 A * | 8/1998 | Frost et al. | 415/174.2 |
| 5,809,269 A | 9/1998 | Favot et al. | |
| 5,923,745 A | 7/1999 | Hurd | |
| 5,940,476 A | 8/1999 | Morganstein et al. | |
| 5,946,388 A | 8/1999 | Walker et al. | |
| 5,953,704 A | 9/1999 | McIlroy et al. | |
| 5,960,384 A | 9/1999 | Brash | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,049,594 A | 4/2000 | Furman et al. | |
| 6,100,885 A | 8/2000 | Donnelly et al. | |
| 6,118,866 A | 9/2000 | Shtivelmann | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,233,546 B1 | 5/2001 | Datig | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,510,414 B1 | 1/2003 | Chaves | |
| 6,513,010 B1 | 1/2003 | Lewin et al. | |
| 6,519,562 B1 | 2/2003 | Phillips et al. | |
| 6,529,871 B1 | 3/2003 | Kanevsky et al. | |
| 6,532,444 B1 | 3/2003 | Weber | |
| 6,538,666 B1 | 3/2003 | Ozawa et al. | |
| 6,553,113 B1 | 4/2003 | Dhir et al. | |
| 6,570,967 B2 | 5/2003 | Katz | |
| 6,574,599 B1 | 6/2003 | Lim et al. | |
| 6,584,180 B2 | 6/2003 | Nemoto | |
| 6,587,556 B1 | 7/2003 | Judkins et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,631,186 B1 | 10/2003 | Adams et al. | |
| 6,662,163 B1 | 12/2003 | Albayradk et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,694,482 B1 | 2/2004 | Arellano et al. | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arlsan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,795,806 B1 | 9/2004 | Lewis et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,836,760 B1 | 12/2004 | Silverman et al. | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,944,592 B1 | 9/2005 | Pickering | |
| 6,963,983 B2 | 11/2005 | Munson et al. | |
| 7,006,605 B1 | 2/2006 | Morganstein et al. | |
| 7,024,368 B1 | 4/2006 | Matheson | |
| 7,031,444 B2 | 4/2006 | Shen et al. | |
| 7,031,908 B1 | 4/2006 | Huang et al. | |
| 7,035,388 B2 | 4/2006 | Kurosaki | |
| 7,043,435 B2 | 5/2006 | Knott et al. | |
| 7,127,398 B1 * | 10/2006 | Yamagishi et al. | 704/270 |
| 7,231,343 B1 | 6/2007 | Treadgold et al. | |
| 7,242,751 B2 | 7/2007 | Bushey et al. | |
| 7,370,086 B2 | 5/2008 | Kroeker et al. | |
| 7,379,876 B2 | 5/2008 | Nakata | |
| 7,450,698 B2 | 11/2008 | Bushey | |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0178005 A1 | 11/2002 | Dusan et al. | |
| 2002/0196277 A1 | 12/2002 | Bushey et al. | |
| 2002/0198714 A1 | 12/2002 | Zhou | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |
| 2003/0130841 A1 | 7/2003 | Bangalore et al. | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187632 A1 | 10/2003 | Menich | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth et al. | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2003/0235287 A1 | 12/2003 | Margolis et al. | |

| | | |
|---|---|---|
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0111479 A1 | 6/2004 | Borden et al. |
| 2004/0120473 A1 | 6/2004 | Birch et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0128624 A1 | 7/2004 | Arellano et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0199394 A1 | 10/2004 | Kuzunuki et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0018825 A1 | 1/2005 | Ho et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0102141 A1* | 5/2005 | Chikuri ............ 704/244 |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141692 A1 | 6/2005 | Scherer et al. |
| 2005/0147218 A1 | 7/2005 | Novack et al. |
| 2005/0169441 A1 | 8/2005 | Yacoub et al. |
| 2005/0169453 A1 | 8/2005 | Knott et al. |
| 2005/0201547 A1 | 9/2005 | Burg et al. |
| 2005/0240411 A1 | 10/2005 | Yacoub et al. |
| 2005/0254632 A1 | 11/2005 | Pasquale et al. |
| 2006/0018443 A1 | 1/2006 | Knott |
| 2006/0023863 A1 | 2/2006 | Joseph et al. |
| 2006/0026049 A1 | 2/2006 | Joseph et al. |
| 2006/0036437 A1 | 2/2006 | Bushey |
| 2006/0039547 A1 | 2/2006 | Klein |
| 2006/0050865 A1 | 3/2006 | Kortum |
| 2006/0062375 A1 | 3/2006 | Pasquale |
| 2006/0072737 A1 | 4/2006 | Paden et al. |
| 2006/0093097 A1 | 5/2006 | Chang |
| 2006/0100998 A1 | 5/2006 | Edwards |
| 2006/0109974 A1 | 5/2006 | Paden |
| 2006/0115070 A1 | 6/2006 | Bushey |
| 2006/0126808 A1 | 6/2006 | Dallessandro |
| 2006/0126811 A1 | 6/2006 | Bushey |
| 2006/0153345 A1 | 7/2006 | Bushey |
| 2006/0161431 A1 | 7/2006 | Bushey |
| 2006/0177040 A1 | 8/2006 | Mitra et al. |
| 2006/0188087 A1 | 8/2006 | Kortum |
| 2006/0195312 A1 | 8/2006 | Knight et al. |
| 2006/0198505 A1 | 9/2006 | Kortum |
| 2006/0215831 A1 | 9/2006 | Knott |
| 2006/0215833 A1 | 9/2006 | Mahoney |
| 2006/0256932 A1 | 11/2006 | Bushey |
| 2006/0291642 A1 | 12/2006 | Bushey |
| 2007/0019800 A1 | 1/2007 | Bushey |
| 2007/0025528 A1 | 2/2007 | Knott |
| 2007/0025542 A1 | 2/2007 | Bushey |
| 2007/0041551 A1 | 2/2007 | Whitecotton |
| 2007/0047718 A1 | 3/2007 | Idler |
| 2007/0047720 A1 | 3/2007 | Brandt |
| 2007/0116230 A1 | 5/2007 | Brandt |
| 2008/0008308 A1 | 1/2008 | Knott |

FOREIGN PATENT DOCUMENTS

| | | |
|---|---|---|
| EP | 0424015 A3 | 4/1991 |
| EP | 0424015 B1 | 4/1991 |
| EP | 0876652 A4 | 9/1996 |
| WO | 97/26612 A1 | 7/1997 |
| WO | 01/37539 A2 | 5/2001 |
| WO | 01/37539 A3 | 5/2001 |
| WO | 2004/017584 | 2/2004 |
| WO | 2004/049222 A2 | 6/2004 |

OTHER PUBLICATIONS

International Search Report and Written Opinion of the International Seraching Authority for International Application No. PCT/US05/41473, Mailed on June 28, 2006, 4 pages.

Non-Final Office Action for U.S. Appl. No. 11/005,494 received from the United States Patent and Trademark Office (USPTO) mailed Oct. 6, 2005, 11 pages.

Notice of Non-Compliant Amendment (37 CFR 1.121) for U.S. Appl. No. 11/005,494 received from the United States Patent and Trademark Office (USPTO) mailed Dec. 19, 2005, 2 pages.

Non-Final Office Action for U.S. Appl. No. 11/005,494 received from the United States Patent and Trademark Office (USPTO) mailed Mar. 23, 2006, 19 pages.

Non-Final Office Action for U.S. Appl. No. 11/005,494 received from the United States Patent and Trademark Office (USPTO) mailed Aug. 3, 2006, 11 pages.

Non-Final Office Action for U.S. Appl. No. 11/005,494 received from the United States Patent and Trademark Office (USPTO) mailed Nov. 27, 2006, 18 pages.

Notice of Allowance and Fee(s) Due for U.S. Appl. No. 11/005,494 received from the United States Patent and Trademark Office (USPTO) mailed Apr. 3, 2007, 9 pages.

Non-Final Office Action for U.S. Appl. No. 11/809,817 received from the United States Patent and Trademark Office (USPTO) mailed Mar. 27, 2009, 13 pages.

Final Office Action for U.S. Appl. No. 11/809,817 received from the United States Patent and Trademark Office (USPTO) mailed Sep. 9, 2009, 18 pages.

Notice of Allowance and Fee(s) Due for U.S. Appl. No. 11/809,817 received from the United States Patent and Trademark Office (USPTO) mailed Feb. 1, 2010, 15 pages.

* cited by examiner

| | SYNONYM TABLE | |
|---|---|---|
| | *SPEECH* | *SYNONYM* |
| | NEED HELP USING | HOW TO USE |
| | I'D LIKE TO GET | ACQUIRE |
| | GET OUT OF | CANCEL |
| | DISCONNECT | CANCEL |
| | I'D LIKE TO KNOW | INQUIRE |
| | PROVIDE ME WITH | ACQUIRE |
| | GET ME HELP | HOW TO USE |
| | HOW MUCH | INQUIRE |

FIG. 4

| OBJECTS | ACTIONS | | | | | |
|---|---|---|---|---|---|---|
| | ACQUIRE | CANCEL | CHANGE | INQUIRE | INFORM | HOW TO USE |
| DSL | X001 | X002 | X003 | X004 | | X005 |
| BASIC SERVICE | X006 | X007 | | X008 | | X009 |
| CALL NOTES | X010 | X011 | | | | X012 |
| CALLER ID | | | X013 | X014 | | |
| BILL | | | | X015 | X016 | |
| PAYMENT | | X015 | X016 | X032 | | X033 |
| OTHER PROVIDERS | | | | X034 | | |
| COUPONS SPECIALS | | | | X035 | | |
| NAME / NUMBER | | | | X036 | | |
| STORE LOCATIONS | | | | X038 | X039 | |

FIG. 5

SYSTEM AND METHOD FOR PROCESSING SPEECH

CLAIM OF PRIORITY

This application is a Continuation Patent Application of, and claims priority from, U.S. patent application Ser. No. 11/809,817, filed on Jun. 1, 2007, and entitled "SYSTEM AND METHOD FOR PROCESSING SPEECH," which is a continuation of U.S. Pat. No. 7,242,751, filed on Dec. 6, 2004, each of which is hereby incorporated by reference in its entirety.

FIELD OF THE DISCLOSURE

The present disclosure relates generally to speech recognition and, more particularly, to speech recognition-enabled automatic call routing service systems and methods.

BACKGROUND

Speech recognition systems are specialized computers that are configured to process and recognize human speech and may also take action or carry out further processes. Developments in speech recognition technologies support "natural language" type interactions between automated systems and users. A natural language interaction allows a person to speak naturally. Voice recognition systems can react responsively to a spoken request. An application of natural language processing is speech recognition with automatic call routing (ACR). A goal of an ACR application is to determine why a customer is calling a service center and to route the customer to an appropriate agent or destination for servicing a customer request. Speech recognition technology generally allows an ACR application to recognize natural language statements so that the caller does not have to rely on a menu system. Natural language systems allow the customer to state the purpose of their call "in their own words."

In order for an ACR application to properly route calls, the ACR system attempts to interpret the intent of the customer and selects a routing destination. When a speech recognition system partially understands or misunderstands the caller's intent, significant problems can result. Further, even in touch-tone ACR systems, the caller can depress the wrong button and have a call routed to a wrong location. When a caller is routed to an undesired system and realizes that there is a mistake, the caller often hangs up and retries the call. Another common problem occurs when a caller gets "caught" or "trapped" in a menu that does not provide an acceptable selection to exit the menu. Trapping a caller or routing the caller to an undesired location leads to abandoned calls. Most call routing systems handle a huge volume of calls and, even if a small percentage of calls are abandoned, the costs associated with abandoned calls are significant.

Current speech recognition systems, such as those sold by Speechworks™, operate utilizing a dynamic semantic model. The semantic model recognizes human speech and creates multiple word strings based on phonemes that the semantic model can recognize. The semantic model assigns probabilities to each of the word strings using rules and other criteria. However, the semantic model has extensive tables and business rules, many that are "learned" by the speech recognition system. The learning portion of the system is difficult to set up and modify. Further, changing the word string tables in the semantic model can be an inefficient process. For example, when a call center moves or is assigned a different area code, the semantic system is retrained using an iterative process.

DETAILED DESCRIPTION

In a particular embodiment, a speech recognition system includes a speech recognition interface and a processor coupled to the speech recognition interface. The processor converts speech received from a call at the speech recognition interface to at least one word string. The processor parses each word string of the at least one word string into first objects and first actions. The processor accesses a synonym table to determine second objects and second actions based on the first objects and the first actions. The processor also selects a preferred object and a preferred action from the second objects and the second actions.

In a particular embodiment, a computerized method of processing speech includes determining a plurality of objects based on speech input and determining a plurality of actions based on the speech input. The computerized method includes comparing the objects and the actions with entries in a synonym table to determine synonym objects and synonym actions. The computerized method includes selecting a preferred object and a preferred action from the synonym objects and the synonym actions. The computerized method also includes routing a call that provided the speech input to a destination based on the preferred object and the preferred action.

In a particular embodiment, a computerized method includes transforming speech input from a caller into a plurality of word strings. The computerized method includes converting the word strings into pairs of objects and actions. The computerized method includes determining from a synonym table synonym pairs from the pairs. The computerized method also includes selecting a preferred pair from the synonym pairs.

Particular systems and particular methods are disclosed for processing a call by receiving caller input in a speech format and utilizing phonemes to convert the speech input into word strings. The word strings are then converted into at least one object and at least one action. A synonym table is utilized to determine actions and objects. Objects generally represent nouns and adjective-noun combinations while actions generally represent verbs and adverb-verb combinations. The synonym table stores natural language phrases and their relationship with actions and objects. The actions and objects are utilized to determine a routing destination utilizing a routing table. The call is then routed based on the routing table. During the process, the word string, the actions, the objects and an action-object pair can be assigned a probability value. The probability value represents a probability that the word string, the action, or the object accurately represent the purpose or intent of the caller.

Figure 1:
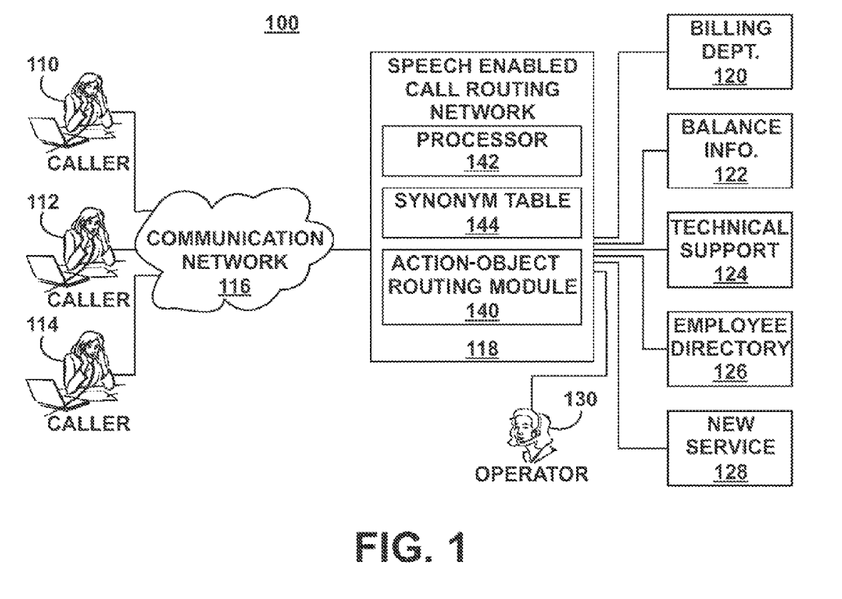
FIG. 1 illustrates a simplified configuration of a telecommunication system.

Referring to FIG. 1, an illustrated communications system 100 that includes a call routing support system is shown. The communications system 100 includes a speech enabled call routing system (SECRS) 118, such as an interactive voice response system having a speech recognition module. The system 100 includes a plurality of potential call destinations. Illustrative call destinations shown include service departments, such as billing department 120, balance information 122, technical support 124, employee directory 126, and new customer service departments 128. The communication network 116 receives calls from a variety of callers, such as the illustrated callers 110, 112, and 114. In a particular embodiment, the communication network 116 may be a public telephone network or may be provided by a voice over Internet protocol (VoIP) type network. The SECRS 118 may include components, such as a processor 142, a synonym table 144, and an action-object routing module 140. The SECRS 118 is coupled to and may route calls to any of the destinations, as shown. In addition, the SECRS 118 may route calls to an agent, such as the illustrated live operator 130. An illustrative embodiment of the SECRS 118 may be a call center having a plurality of agent terminals attached (not shown). Thus, while only a single operator 130 is shown, it should be understood that a plurality of different agent terminals or types of terminals may be coupled to the SECRS 118, such that a variety of agents may service incoming calls. In addition, the SECRS 118 may be an automated call routing system. In a particular embodiment, the action-object routing module 140 includes an action-object lookup table for matching action-object pairs to desired call routing destinations.

Figure 2:
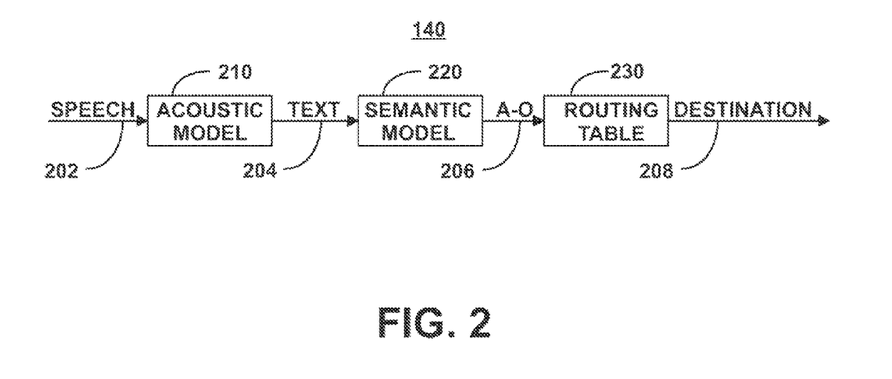
FIG. 2 is a general diagram that illustrates a method of routing calls.

Referring to FIG. 2, an illustrative embodiment of an action-object routing module 140 is shown. In this particular embodiment, the action-object routing module 140 includes an acoustic processing model 210, semantic processing model 220, and action-object routing table 230. The acoustic model 210 receives speech input 202 and provides text 204 as its output. Semantic model 220 receives text 204 from the acoustic model 210 and produces an action-object pair 206 that is provided to the action-object routing table 230. The routing table 230 receives action-object pairs 206 from semantic model 220 and produces a desired call routing destination 208. Based on the call routing destination 208, a call received at a call routing network 118 may be routed to a final destination, such as the billing department 120 or the technical support service destination 124 depicted in FIG. 1. In a particular embodiment, the action-object routing table 230 may be a look up table or a spreadsheet, such as Microsoft Excel™.

Figure 3:
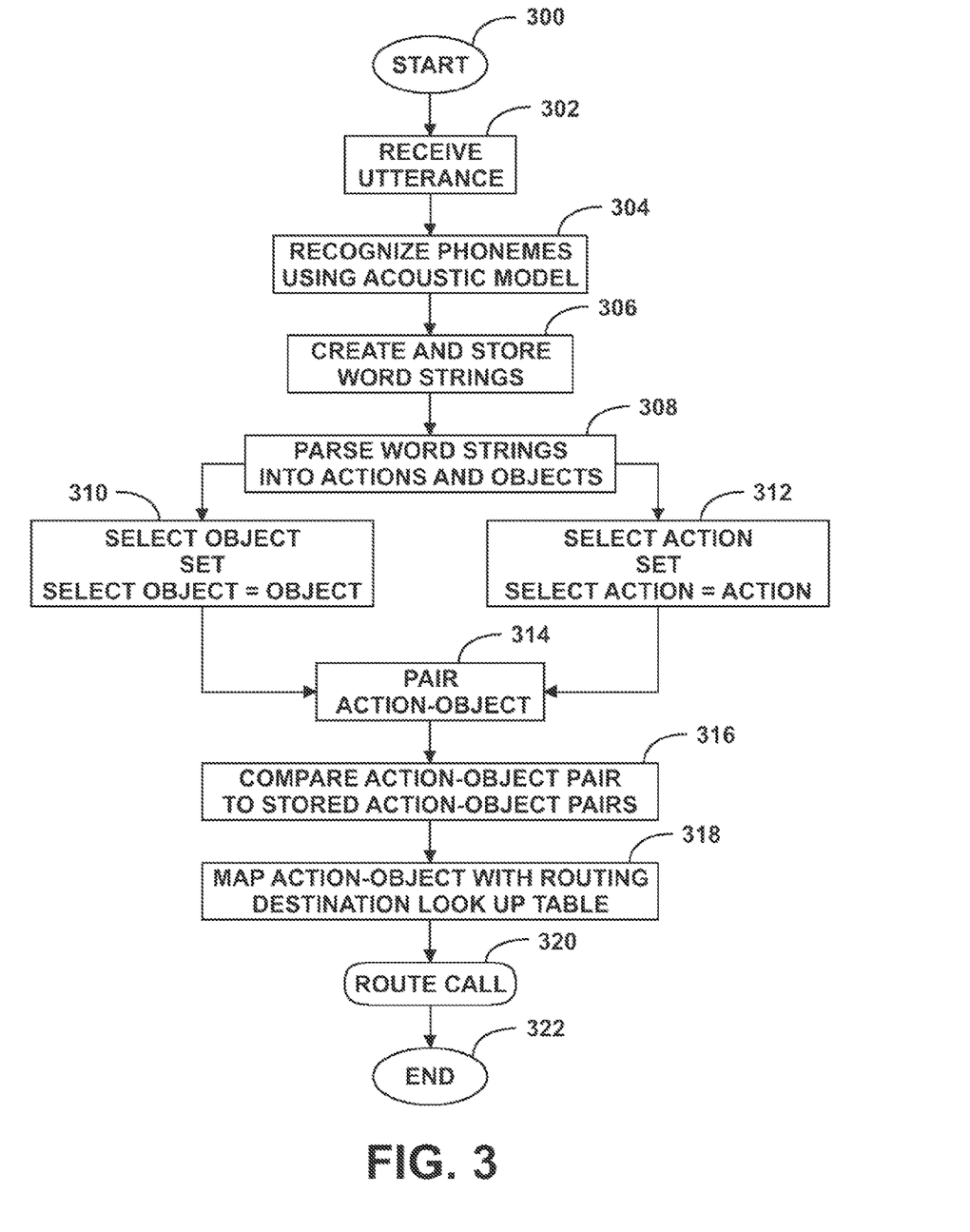
FIG. 3 is a flow diagram that illustrates a method of processing and routing calls.

Referring to FIG. 3, an illustrative embodiment of a method of processing a call using an automated call routing system is illustrated. The method starts at 300 and proceeds to step 302 where a speech input signal, such as a received utterance, is received or detected. Using phonemes, the received speech input is converted into a plurality of word strings or text in accordance with an acoustic model, as shown at steps 304 and 306. In a particular embodiment, probability values are assigned to word strings based on established rules and the coherency of the word string. Next, at step 308, the word strings are parsed into objects and actions. Objects generally represent nouns and adjective-noun combinations while actions generally represent verbs and adverb-verb combinations. The actions and objects are assigned confidence values or probability values based on how likely they are to reflect the intent of the caller. In a particular embodiment a probability value or confidence level for the detected action and the detected object is determined utilizing the probability value of the word string used to create the selected action and the selected object.

Many possible actions and objects may be detected or created from the word strings. The method attempts to determine and select a most probable action and object from a list of preferred objects and actions. To aid in this resolution a synonym table, such as the synonym table of FIG. 4 can be utilized to convert detected actions and objects into preferred actions and objects. Thus, detected objects and actions are converted to preferred actions and objects and assigned a confidence level. The process of utilizing the synonym table can alter the confidence level. The synonym table stores natural language phrases and their relationship with a set of actions and objects. Natural language spoken by the caller can be compared to the natural language phrases in the table. Using the synonym table, the system and method maps portions of the natural phrases to detected objects and maps portions of the natural spoken phrase to detected actions. Thus, the word strings are converted into objects and actions, at steps 310 and 312 respectively and the selected action and object are set to the action and object that will be utilized to route the call. The action and object with the highest confidence value are selected based on many criteria such as confidence value, business rules, etc., in steps 310 and 312.

Figure 5:
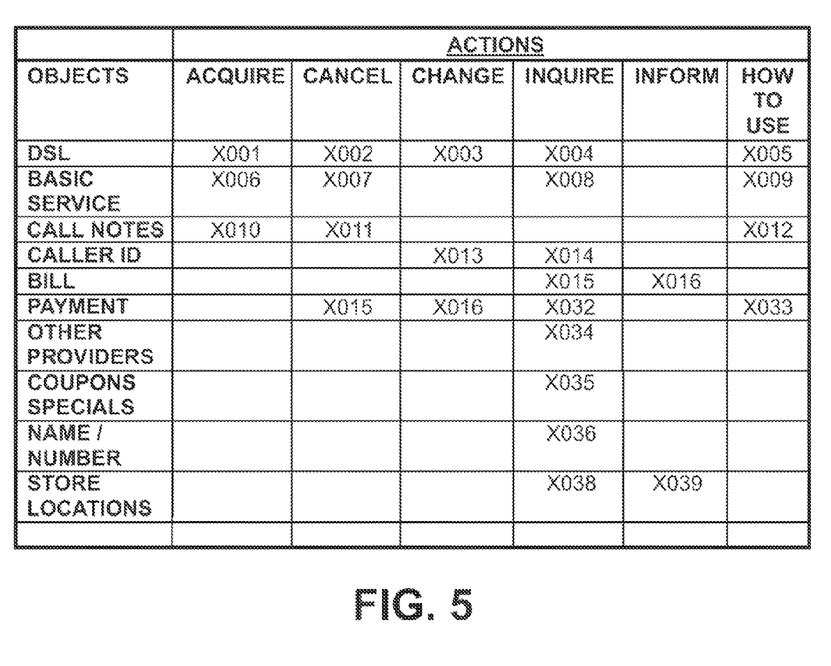
FIG. 5 is a table illustrating action-object pairs and call destinations relating to the action object pairs.

At step 310 and 312, multiple actions and objects can be detected and provided with a probability value according to the likelihood that a particular action or object identifies a customer's intent and thus will lead to a successful routing of the call and a dominant action and dominant object are determined. Next, at step 314, dominant objects and actions are paired together. At step 316, a paired action-object is compared to an action-object routing table, such as the action object routing table of FIG. 5. The action-object routing table in FIG. 5 is generally a predetermined list. When objects and actions find a match, then the destination of the call can be selected at step 318, and the call is routed, at step 320. The process ends at step 322.

Figure 4:
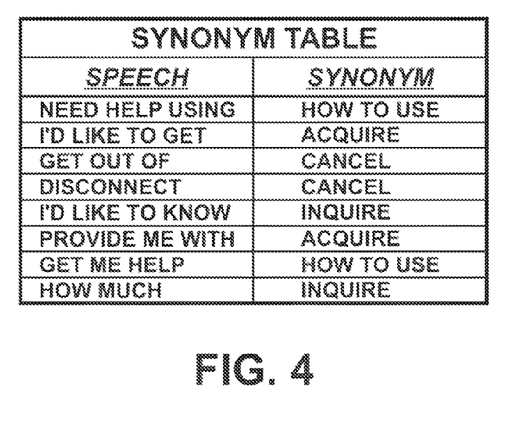
FIG. 4 is a table that depicts speech input and mapped synonym terms.

Referring to FIG. 4, as an example, it is beneficial to convert word strings such as "I want to have" to actions such as "get." This substantially reduces the size of the routing table. When a call destination has a phone number change, a single entry in the routing table may accommodate the change. Prior systems may require locating numerous entries in a voluminous database, or retraining a sophisticated system. In accordance with the present system, dozens of differently expressed or "differently spoken" inputs that have the same caller intent can be converted to a single detected action-object pair. Further, improper and informal sentences as well as slang can be connected to an action-object pair that may not bear phonetic resemblance to the words uttered by the caller. With a directly mapped lookup table such as the table in FIG. 4, speech training and learning behaviors found in conventional call routing systems are not required. The lookup table may be updated easily, leading to a low cost of system maintenance.

In addition, the method may include using a set of rules to convert a word string into an object or action. In a particular example, geographic designation information, such as an area code, may be used to distinguish between two potential selections or to modify the probability value. In the event that the lookup table of the action-object pair does not provide a suitable response, such as where no entry is found in the routing table, the call may be routed to a human operator or agent terminal in response to a failed access to the action-object lookup table.

Traditional automatic call routing systems are able to assign a correct destination 50-80% of the time. Particular embodiments of the disclosed system and method using action-object tables can assign a correct destination 85-95% of the time. Due to higher effective call placement rates, the number of abandoned calls (i.e., caller hang-ups prior to completing their task) is significantly reduced, thereby reducing operating costs and enhancing customer satisfaction. In addition, the automated call-routing system offers a speech recognition interface that is preferred by many customers to touch tone systems.

The disclosed system and method offers significant improvements through decreased reliance on the conventional iterative semantic model training process. With the disclosed system, a semantic model assigns an action-object pair leading to increased call routing accuracy and reduced costs. In particular implementations, the correct call destination routing rate may reach the theoretical limit of 100%, depending upon particular circumstances. In some cases, certain action-object systems have been implemented that achieve a 100% coverage rate, hit rate, and call destination accuracy rate.

The disclosed system and method is directed generally to integration of action-object technology with speech enabled automated call routing technology. The integration of these two technologies produces a beneficial combination as illustrated. The illustrated system has been described in connection with a call center environment, but it should be understood that the disclosed system and method is applicable to other user interface modalities, such as web-based interfaces, touchtone interfaces, and other speech recognition type systems. The disclosed system and method provides for enhanced customer satisfaction because the customer's intent can be recognized by an action-object pair and a high percentage of calls reach the intended destination.

The above-disclosed subject matter is to be considered illustrative, and not restrictive, and the appended claims are intended to cover all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A speech recognition system, comprising:
    a speech recognition interface; and
    a processor coupled to the speech recognition interface to:
        convert speech received from a caller at the speech recognition interface to at least one word string;
        parse each word string of the at least one word string into first objects and first actions;
        access a synonym table to determine second objects and second actions based on the first objects and the first actions; and
        select a preferred object and a preferred action from the second objects and the second actions.

2. The speech recognition system of claim 1, wherein the processor is configured to route the caller to a destination based on the preferred action and the preferred object.

3. The speech recognition system of claim 2, wherein the destination is determined from an action-object routing table based on the preferred action and the preferred object.

4. The speech recognition system of claim 1, wherein the processor converts the speech received from the caller at the speech recognition interface to the at least one word string based on phonemes.

5. The speech recognition system of claim 1, wherein the processor is configured to assign a probability value to each word string of the at least one word string based at least in part on a coherency of the word string.

6. The speech recognition system of claim 5, wherein the processor creates first action-object pairs from the first actions and the first objects of each word string of the at least one word string, wherein the processor is configured to assign a confidence value to each first action-object pair, and wherein the confidence value for a particular first action-object pair is based at least in part on the probability value of the word string used to create the particular first action-object pair.

7. The speech recognition system of claim 6, wherein the processor creates a second action-object pair from each first action-object pair when the processor accesses the synonym table to determine the second objects and the second actions, wherein the processor is configured to assign a confidence level to each second action-object pair, wherein a particular confidence level for a particular second action-object pair is based at least in part on the confidence value of the first action-object pair used to obtain the particular second action-object pair.

8. The speech recognition system of claim 7, wherein the preferred object and the preferred action are selected from the second action-object pairs based at least in part on the preferred object and the preferred action having a high confidence level compared to other second action-object pairs.

9. The speech recognition system of claim 1, wherein the first objects correspond in part to nouns in the at least one word string.

10. The speech recognition system of claim 1, wherein the first actions correspond in part to verbs in the at least one word string.

11. A computerized method of processing speech, the method comprising:
    determining a plurality of objects based on speech input;
    determining a plurality of actions based on the speech input;
    comparing the plurality of objects and the plurality of actions with entries in a synonym table to determine synonym objects and synonym actions;
    selecting a preferred object and a preferred action from the synonym objects and the synonym actions; and
    routing a call that provided the speech input to a destination based on the preferred object and the preferred action.

12. The computerized method of claim 11, wherein determining the plurality of objects and the plurality of actions comprises:
    converting the speech input to word strings based on the speech input; and
    parsing the word strings into the plurality of objects and the plurality of actions.

13. The computerized method of claim 11, wherein the preferred object and the preferred action are selected at least in part based on confidence levels of the synonym objects and the synonym actions.

14. The computerized method of claim 11, wherein the destination comprises one of a billing department, a balance information service, a new services department, and a technical support department.

15. The computerized method of claim 11, wherein the preferred object is not phonetically related to content of the speech input.

16. The computerized method of claim 11, wherein a particular object determined based on the speech input comprises a natural language phrase and the preferred object associated with the particular object comprises a term related to the natural language phrase.

17. The computerized method of claim 11, wherein a particular action determined based on the speech input comprises a natural language phrase and the preferred action associated with the particular action comprises a term related to the natural language phrase.

18. A computerized method, comprising:
   transforming speech input from a call into a plurality of word strings;
   converting the word strings into pairs of objects and actions;
   determining, from a synonym table, synonym pairs based on the pairs of objects and actions;
   selecting a preferred pair from the synonym pairs; and
   determining a destination for the call based on an object and an action of the referred pair.

19. The computerized method of claim 18, wherein selecting the preferred pair comprises choosing a synonym pair based at least in part on a confidence value of the synonym pair.

20. The computerized method of claim 11, wherein the preferred object is phonetically unrelated to content of the speech input.

* * * * *

UNITED STATES PATENT AND TRADEMARK OFFICE
CERTIFICATE OF CORRECTION

PATENT NO. : 8,306,192 B2
APPLICATION NO. : 12/750792
DATED : November 6, 2012
INVENTOR(S) : Robert R. Bushey et al.

It is certified that error appears in the above-identified patent and that said Letters Patent is hereby corrected as shown below:

In the Claims section, Column 8, Claim 18, Line 5, "and an action of the referred pair." should read --and an action of the preferred pair.--.

Signed and Sealed this
Twenty-fifth Day of June, 2013

Teresa Stanek Rea
*Acting Director of the United States Patent and Trademark Office*